United States Patent
Chlopek

(10) Patent No.: US 10,538,671 B2
(45) Date of Patent: *Jan. 21, 2020

(54) COATED PIGMENTS FOR DYEING PVC

(71) Applicant: LANXESS DEUTSCHLAND GMBH, Cologne (DE)

(72) Inventor: Krzysztof Chlopek, Krefeld (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,538

(22) PCT Filed: Jun. 17, 2015

(86) PCT No.: PCT/EP2015/063630
§ 371 (c)(1),
(2) Date: Dec. 16, 2016

(87) PCT Pub. No.: WO2015/193390
PCT Pub. Date: Dec. 23, 2015

(65) Prior Publication Data
US 2017/0137631 A1    May 18, 2017

(30) Foreign Application Priority Data

Jun. 18, 2014 (EP) .................................. 14173003

(51) Int. Cl.
| | |
|---|---|
| *C09C 1/24* | (2006.01) |
| *C09C 3/06* | (2006.01) |
| *C09C 3/08* | (2006.01) |
| *C08K 3/22* | (2006.01) |
| *C08K 9/04* | (2006.01) |
| *C08K 3/013* | (2018.01) |

(52) U.S. Cl.
CPC .............. *C09C 1/24* (2013.01); *C08K 3/22* (2013.01); *C08K 9/04* (2013.01); *C09C 3/063* (2013.01); *C09C 3/08* (2013.01); *C01P 2004/84* (2013.01); *C08K 3/013* (2018.01); *C08K 2003/2272* (2013.01)

(58) Field of Classification Search
CPC .. C09C 1/24; C09C 1/043; C09C 1/22; C09C 3/063; C09C 3/08; C08K 3/22; C08K 9/04; C08K 3/013

USPC ................................................ 523/200
See application file for complete search history.

(56) References Cited

U.S. PATENT DOCUMENTS

| | | | |
|---|---|---|---|
| 4,710,375 A | 12/1987 | Takasuka et al. | |
| 4,734,136 A | 3/1988 | Burow | |
| 5,059,250 A | 10/1991 | Burow et al. | |
| 5,401,313 A | 3/1995 | Supplee et al. | |
| 5,770,310 A * | 6/1998 | Noguchi ................. | A61K 8/19 428/403 |
| 9,777,920 B2 * | 10/2017 | Fan ........................ | F23C 99/00 |
| 2010/0291014 A1 | 11/2010 | Tellefsen et al. | |
| 2015/0299430 A1 | 10/2015 | Chlopek et al. | |

FOREIGN PATENT DOCUMENTS

| | | | |
|---|---|---|---|
| EP | 0799865 A2 * | 10/1997 | ............... A61K 8/19 |
| GB | 1395700 | 5/1975 | |
| JP | 50019844 | 3/1975 | |
| JP | 53106748 | 9/1978 | |
| JP | 53136038 | 11/1978 | |

OTHER PUBLICATIONS

Lele, S.S., J. Vinyl Tech., 1984, vol. 6, No. 2, pp. 77 to 81.
P. et al., Polymer 1992, vol. 33, No. 13, pp. 2704-2708, Abstract.
European Search Report from European Application No. 14173003, dated Sep. 5, 2014, two pages.
Australian Search Report from Australian Application No. 2015276115, dated Sep. 5, 2014, eight pages.
Japanese Office Action dated Mar. 12, 2018 on corresponding Application No. 2016-573793.

* cited by examiner

*Primary Examiner* — Hannah J Pak

(57) ABSTRACT

The present invention relates to pigments comprising at least one inorganic compound selected from the group of iron oxides, iron oxide hydroxides, zinc ferrites, zinc oxides, magnesium ferrites and manganese ferrites, wherein the at least one inorganic compound is equipped with a coating comprising at least one hydroxide or oxide of magnesium or calcium and at least one fatty acid salt, to processes for production thereof, to the use thereof for coloring polyvinyl chloride (PVC) and to processes for coloring PVC and to PVC colored with such pigments, and also to plastics products comprising such pigments.

5 Claims, No Drawings

COATED PIGMENTS FOR DYEING PVC

The present invention relates to pigments comprising at least one inorganic compound selected from the group of iron oxides, iron oxide hydroxides, zinc ferrites, zinc oxides, magnesium ferrites and manganese ferrites, wherein the at least one inorganic compound is equipped with a coating comprising at least one hydroxide or oxide of magnesium or calcium and at least one fatty acid salt, to processes for production thereof, to the use thereof for coloring polyvinyl chloride (PVC) and to processes for coloring PVC and to PVC colored with such pigments, and also to plastics products comprising such pigments.

PVC is used predominantly as base material, for example, for window profiles, pipes, floor coverings and roofing sheets in the construction sector. Rigid and flexible films are likewise produced from PVC. PVC is also often used as insulation material for electrical cables, and for electrical switch boxes, shrink tubes for cables, cable ducts or cable covers.

PVC belongs to the group of the amorphous thermoplastic polymers. The plastic is typically hard and brittle and is customarily adapted for the different applications by the addition of plasticizers and stabilizers.

PVC is typically used with different contents of plasticizers, PVC with a content of plasticizers of 0% to 12% is also called rigid PVC. PVC with a content of plasticizers of more than 12% is also called flexible PVC (Römpp Chemielexikon [Römpp's Chemical Dictionary], Online Version 3.28, article last updated: December 2009, document identifier: RD-16-03650), in general, plasticizer contents are reported in percent by weight.

PVC is frequently colored with organic and inorganic pigments. Organic pigments used are, for example, isoindoles, naphthol AS, copper phthalocyanine pigments or monoazo calcium salts. Frequently used pigments from the group of the inorganic pigments are mixed phase metal oxide pigments such as nickel rutile pigments, chromium rutile pigments, iron chromites, inverse cobalt or copper spinals or iron cobalt chromite spinels. These pigments are very weathering- and light-stable, but have the drawback that they are several times more costly than other iron-containing inorganic pigments.

The coloring of PVC with inorganic pigments such as iron oxides or iron oxide hydroxides, zinc ferrites, magnesium ferrites or manganese ferrites is also known. Iron oxides and iron oxide hydroxides are notable for being particularly lightfast pigments which have a constant color over a long period even under a wide variety of different weathering conditions. However, in the case of coloring of PVC with iron oxides or iron oxide hydroxides, zinc oxides, zinc ferrites, magnesium ferrites or manganese ferrites according to the prior art, homogeneous or inhomogeneous discoloration of the product occurs both in the course of processing at the high temperatures required and on exposure of the shaped plastic to light, UV light or heat. This unwanted phenomenon is much more serious in the case of rigid PVC, since products made from rigid PVC are frequently used outdoors, where weathering-related effects are of course more intense. In the case of products made from flexible PVC which are used predominantly indoors, such discoloration likewise occurs on occasion, for example shortly after processing. These adverse effects have already long been known and are described, for example, in S. S Lele, J. Vinyl Tech. 1984, vol. 6, no. 2, p. 77 to 81 or P. Carty et al., Polymer 1992, vol. 33, no. 13, p. 2704-2708.

DE 3539306 A1 describes heat-resistant yellow pigments which have been coated with aluminum phosphate hydroxides of the general formula $[AlO]_xPO_4[OH]_{x+3}$ for coloring of thermoplastic polymers. However, in-house experiments have shown that PVC colored with these coated pigments does not have sufficiently higher thermal stability than the PVC colored with the uncoated pigment. In-house experiments have also shown that PVC colored by iron oxides coated with other inorganic aluminum compounds, for example aluminum oxide or aluminum hydroxide or magnesium phosphate, likewise does not have higher thermal stability than PVC colored by uncoated iron oxides.

It was therefore an object of the present invention to provide pigments comprising at least one inorganic compound selected from the group of iron oxides, iron oxide hydroxides, zinc ferrites, zinc oxides, magnesium ferrites and manganese ferrites, which do not lead to unwanted homogeneous or inhomogeneous discoloration of the PVC colored therewith, either in the form of plastics products or of products produced therefrom.

It has now been found that, surprisingly,
pigments comprising at least one inorganic compound selected from the group of the iron oxides, iron oxide hydroxides, zinc ferrites, zinc oxides, magnesium ferrites and manganese ferrites, wherein the at least one inorganic compound is equipped with a coating comprising
    at least one hydroxide or oxide of magnesium or calcium and
    at least one calcium salt or magnesium salt of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19,
achieve this object and overcome the above-described disadvantages of the prior art pigments.

Examples of iron oxides present in the pigments of the invention include hematite (iron oxide red, $\alpha$-$Fe_2O_3$), maghemite (brown iron oxide, $\gamma$-$Fe_2O_3$) or magnetite (iron oxide black, $Fe_3O_4$), preferably hematite (iron oxide red, $\alpha$-$Fe_2O_3$).

From the group of iron oxide hydroxides, the pigments of the invention contain, for example, goethite (iron oxide yellow, $\alpha$-FeOOH) or lepidocrocite ($\gamma$-FeOOH), Zinc ferrites, magnesium ferrites and manganese ferrites belong to the group of the mixed phase pigments of the general formula $M_xFe_{3-x}O_4$ where M is Zn, Mg or Mn, and x comprises values greater than 0 and not more than 1. The pigment of the invention may also comprise one or more different mixed phase pigments from those mentioned above.

Zinc oxide in the context of the invention is ZnO.

Preferably, the pigment of the invention contains just one inorganic compound selected from the group of iron oxides, iron oxide hydroxides, zinc ferrites, zinc oxides, magnesium ferrites and manganese ferrites.

The coating present in the pigments of the invention is preferably bonded directly to the at least one inorganic compound selected from the group of the iron oxides, iron oxide hydroxides, zinc ferrites, zinc oxides, magnesium ferrites and manganese ferrites. "Directly" in this connection means that there is no further interlayer present between the coating and the inorganic compound selected from the group of the iron oxides, iron oxide hydroxides, zinc ferrites, zinc oxides, magnesium ferrites and manganese ferrites. In this connection, "interlayer" means any other coating apart from the coating of the invention.

Preferably, the coating of the at least one inorganic compound consists of an outer layer and an inner layer, wherein
A) one of the two layers comprises at least one hydroxide or oxide of magnesium or calcium and
B) the other of the two layers comprises at least one calcium salt or magnesium salt of a fatty add of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19,
where the layer according to A) is preferably the inner layer.

The coating can be detected, for example, via electron micrographs of the pigments, The fatty adds of the general formula $C_nH_{2n+1}COOH$ (I) are saturated fatty acids. Preferably, the calcium salts and/or magnesium salts of the saturated fatty add are stearic acid (n=17). The fatty acids of the general formulae $C_nH_{2n-1}COOH$ (II) are monounsaturated fatty adds, e.g. oleic acid (n=17). The fatty acids of the general formulae $C_nH_{2n-3}COOH$ (III) are diunsaturated fatty adds, e.g. linoleic add (n=17). The fatty adds of the general formulae $C_nH_{2n-5}COOH$ (IV) are triunsaturated fatty adds, e.g. calendulic add (n=17). Calcium stearate and/or magnesium stearate are particularly preferred.

In the context of the invention, "fatty add salt" is used synonymously with "calcium salt or magnesium of a fatty add salt of the general formulae (I), (II), (III) and/or (IV), where n is from 10 to 20, preferably from 15 to 19".

The pigments of the invention contain preferably from 0.3% to 30% by weight, more preferably from 0.5% to 25% by weight, most preferably from 1% to 20% by weight, of magnesium and calcium, calculated as the sum of the contents of the elements magnesium and calcium, where the sum total of the contents of the elements magnesium and calcium is based on the total weight of the pigment of the invention.

In a further preferred embodiment, the pigments of the invention contain from 0.2% to 15% by weight of at least one fatty acid salt, preferably of calcium stearate and/or magnesium stearate, where the percentages by weight are the ratio of the sum total of the weights of the fatty acid salts relative to the total weight of the pigment of the invention. The content of the elements magnesium and calcium, unless stated otherwise, is determined via optical emission spectroscopy after excitation in the inductively coupled plasma (ICP-OES). The content of the elements magnesium and calcium can also be determined by other quantitative test methods, for example by atomic absorption spectrometry (AAS).

The content of fatty acid salt, preferably of calcium stearate and/or magnesium stearate, in the pigments of the invention is determined, for example, via near infrared (NIR) or mid-IR spectroscopy (MIR). The measurement can be effected here directly on the sample. The presence of fatty acid salt, preferably calcium and/or magnesium stearate, can be effected via suitable qualitative test methods, for example mass spectrometry or NMR spectroscopy. For this purpose, processing of the sample may be necessary, such that the fatty acid salt present in the coating is separated from the pigment. This is effected, for example, by means of solvents and/or with an alkaline liquid phase, for example sodium hydroxide solution. In the alkaline liquid phase, the fatty acid is present as a salt, for example as the sodium salt, in dissolved form and can be extracted into an organic phase as the free fatty acid after acidification. Such qualitative and quantitative test methods on fatty acid salts are known to those skilled in the art and, after calibration tests required beforehand, afford reproducible results independent of the test method. The at least one fatty acid salt, preferably calcium stearate and/or magnesium stearate, can also be detected via gas chromatography/mass spectrometry coupling (GC-MS coupling). For this purpose, the at least one fatty acid salt present in the sample to be examined is reacted with an alcohol, for example butanol, to give the corresponding alkyl ester. This is then determined qualitatively and quantitatively via GC-MS coupling. Whether the at least one fatty acid salt, preferably calcium stearate and/or magnesium stearate, is present as a further coating of the pigment or as a constituent of a mixture of the coated pigment can be determined unambiguously by electron micrographs of the sample to be examined. In the case of a coating, the at least one hydroxide or oxide of magnesium or calcium and the at least one fatty acid salt, preferably calcium stearate and/or magnesium stearate, can be detected on the surface of the pigment particles via scanning electron microscopy (SEM) together with energy-dispersive x-ray analysis (EDX). In the case of a mixture, the at least one hydroxide or oxide of magnesium or calcium and/or the at least one fatty acid salt, preferably calcium stearate and/or magnesium stearate, is specifically not detected at the surface of the pigment particles but in the form of separate particles present in the interstices between the particles of the inorganic compound selected from the group of iron oxides, iron oxide hydroxides, zinc ferrites, zinc oxides, magnesium ferrites and manganese ferrites.

In a further preferred embodiment, the pigments of the invention consist of at least one inorganic compound selected from the group of iron oxides, iron oxide hydroxides, zinc ferrites, magnesium ferrites and manganese ferrites, wherein the at least one inorganic pigment is equipped with a coating comprising hydroxides and/or oxides of magnesium and/or calcium, more preferably comprising hydroxides of magnesium and/or calcium, and additionally a coating consisting of at least one fatty acid salt, preferably of calcium stearate and/or magnesium stearate.

The pigments of the invention typically have oil values between 20 and 40 g of oil/100 g of sample, preferably between 23 and 39 g of oil/100 g of sample.

The invention encompasses every conceivable combination of the various defined process and physical parameters and the areas of preference thereof.

It has now been found that, surprisingly, PVC colored with the pigments of the invention has a higher thermal stability than PVC colored with the corresponding uncoated pigments. The elevated thermal stability of the PVC colored with the pigments of the invention can be shown by means of a thermal treatment with a kneader when the plot of the torque on the kneader against time and the temperature of the kneaded product is recorded and compared for various samples. In the breakdown of the PVC, degradation of the polymer occurs, which leads to a reduction in the viscosity and hence to a decrease in the torque on the kneader.

In addition, the elevated thermal stability of the PVC colored with the pigment of the invention can be measured by the testing of specimens in a Mathis oven. This test method is described in PCT/EP2013/076585. The details of the test methods and the evaluation thereof can be found in the "Examples and Methods" section.

The present invention also relates to the use of the pigment of the invention for coloring PVC, preferably rigid PVC.

The present invention also relates to a method of coloring PVC, preferably rigid PVC, with the pigment of the invention. The coloring can be effected by customary methods, for example by mixing, kneading or extruding uncolored PVC with the pigment in the melt or by melting PVC dryblends comprising the pigment of the invention.

The present invention also relates to plastics products, for which the terms masterbatch, compounds or colored end product are used synonymously, comprising at least one pigment of the invention, and additionally comprising at least one polymer.

The at least one polymer is preferably at least 50% by weight, preferably at least 80% by weight, formed from the monomer vinyl chloride, This is the case firstly if the polymer is a PVC copolymer formed not only from vinyl chloride but also from other monomers, for example vinyl acetate or butyl acrylate. In that case, the copolymer has preferably been formed at least to an extent of 50% by weight, more preferably at least to an extent of 80% by weight, from the monomer vinyl chloride. This is the case secondly if the polymer comprises mixtures or blends of various polymers, one of the polymers being a PVC homopolymer or a PVC copolymer. In that case, the mixture or blend has preferably been formed at least to an extent of 50% by weight, more preferably at least to an extent of 80% by weight, from the monomer vinyl chloride. The polymer is preferably PVC, more preferably rigid PVC.

Colored PVC in the context of the invention is understood to mean a PVC in which the pigment of the invention has been incorporated into the polymer matrix of the polyvinyl chloride.

Compounds further comprise, for example, processing aids, reinforcers, fillers, dyes, further pigments and other organic and inorganic additives, and thus enable the production of a wide variety of different moldings, for example through extrusion, injection molding, calendaring or blow-molding. The moldings generally correspond to the end products, called products in the context of this invention, for example window frames, pipes, insulation material, films or bottles. The PVC is colored by adding masterbatches or adding the pigment directly to the compounds.

The plastics product of the invention comprises, according to the end use, different amounts of pigment of the invention.

Plastics products from the group of the masterbatches are typically used in the form of "color concentrates" for coloring of PVC or other plastics products. Therefore, these plastics products have a relatively high pigment content of 10% to 90% by weight, more preferably of 20% to 70% by weight, of pigment of the invention and a polymer content of 10% to 90% by weight, preferably of 30% to 80% by weight, based in each case on the total weight of the plastics product. In a further embodiment, the masterbatches comprise, as polymer, waxes, optionally in a mixture with PVC, or else without mixing with PVC. Waxes selected are, for example, polyethylene waxes, Fischen-Tropsch waxes, mineral waxes, montan waxes, vegetable waxes and/or animal waxes. The aforementioned components preferably add up to 40% to 100% by weight, more preferably to 70% to 100% by weight, based on the total weight of the plastics product.

If the plastics product is already in its for ultimate use as compound with the desired color, the content of pigment of the invention is preferably from 0.1% to 10% by weight, more preferably 0.5% to 5% by weight, and the polymer content is preferably from 60% to 99.9% by weight, more preferably 70% to 99.5% by weight, based in each case on the total weight of the plastics product.

The present invention also relates to a process for producing the plastics products of the invention, especially compounds and masterbatches, by kneading or extruding polymer with the pigment of the invention.

PVC is used in accordance with the invention with different contents of plasticizers. PVC with a content of plasticizers of 0% to 12% is also called rigid PVC. PVC with a content of plasticizers of more than 12% is also called flexible PVC (Römpp Chemielexikon, Online Version 3.28, article last updated: December 2009, document identifier: RD-16-03650).

The invention also relates to a plastics product comprising from 0% to 15% by weight, preferably from 0% to 12% by weight, of plasticizer, based on the amount of polymer present in the plastics product.

Suitable plasticizers are, for example, primary and secondary plasticizers and extenders. Primary plasticizers are, for example, phthalic esters, trimellitic esters, phosphates and polymer plasticizers. Secondary plasticizers are, for example, adipates, azeiates, decanedioic esters and alkyl fatty acid esters. The group of the extenders includes, for example, aromatic hydrocarbons and chloroparaffins (from Römpp Chemielexikon[Römpp's Chemical Dictionary], Online Version 3.2,8, article last updated: March 2006, document identifier: RD-23-00460).

The present invention also relates to a plastics product, for which the term "PVC dryblend" is also used, comprising a mixture of pulverulent polymer, preferably PVC, more preferably rigid PVC, and pigment of the invention. PVC dryblends of this kind may additionally also comprise the additives required for the production of compounds (e.g. fillers, stabilizers, optionally further plasticizers, dyes, optionally further pigments). These may be present either in substance alongside the PVC or may already have been incorporated into the PVC of the dryblend. Dryblends are typically produced by intensive mixing of the above-described constituents thereof between 0.5 and 20 K below the melting point of the plastic. The dry-blends can be used to produce the products by the processing methods customary for PVC, such as extrusion, injection molding, calendering or blow-molding.

The present invention also relates to a product, for which the terms "molding" or "finished good" are also used synonymously in the context of this invention, comprising at least one plastics product of the invention. Products of this kind are, for example, window profiles, pipes, floor coverings, insulation material or roofing sheets.

The present invention also relates to a process for producing the pigments of the invention.

The process of the invention comprises at least the steps of:

I) applying the coating of at least one hydroxide or oxide of magnesium or calcium and subsequently applying the coating of at least one calcium salt or magnesium salt of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19, to the inorganic compound, or II) applying the coating of at least one calcium salt or magnesium salt of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19, and subsequently applying the coating of at least one hydroxide or oxide of magnesium or calcium to the inorganic compound, or III) applying the coating of at least one hydroxide or oxide of magnesium or calcium and simultaneously applying the coating of at least one calcium salt or magnesium salt of a fatty acid of the general formulae $C_nH_{2n+1}COOH$ (I), $C_nH_{2n-1}COOH$ (II), $C_nH_{2n-3}COOH$ (III) and/or $C_nH_{2n-5}COOH$ (IV), where n is from 10 to 20, preferably from 15 to 19, to the inorganic compound.

For application of the coating, it is possible to employ any processes which lead to coating of the compounds mentioned onto inorganic pigments. These include application by grinding, precipitation or spraying of the compounds with which the inorganic compound is to be coated, either in solid form or in suspension form or in solution form.

In a preferred embodiment for production of the pigment of the invention, in which the coating of at least one hydroxide or oxide of magnesium or calcium is the inner layer, the preferred process of the invention comprises at least the steps of a) providing an aqueous suspension of at least one inorganic compound selected from the group of iron oxides, iron oxide hydroxides, zinc ferrites, zinc oxides, magnesium ferrites and manganese ferrites, and b) precipitating the coating of at least one hydroxide or oxide of magnesium or calcium onto the inorganic compound by adding magnesium salts and/or calcium salts, preferably in dissolved form, to the suspension from step a) and then adding a precipitant selected from the group of alkali metal hydroxides, alkaline earth metal hydroxides and ammonia, preferably in dissolved form, to the suspension or b') precipitating the coating of at least one hydroxide or oxide of magnesium or calcium onto the inorganic compound by adding a precipitant selected from the group of alkali metal hydroxides, alkaline earth metal hydroxides and ammonia, preferably in dissolved form, to the suspension from step a) and then adding magnesium salts and/or calcium salts, preferably in dissolved form, to the suspension, and c) applying the second coating comprising at least one calcium salt or magnesium salt of a fatty acid of the general formulae (I), (II), (Ill) and/or (IV), where n is from 10 to 20, preferably from 15 to 19, preferably comprising calcium stearate and/or magnesium stearate, by mixing the pigment from steps b) or)b° with at least one calcium salt and/or magnesium salt of at least one fatty acid of the general formulae (I), (II), (III) and/or (IV), where n is from 10 to 20, preferably from 15 to 19, preferably comprising calcium stearate and/or magnesium stearate, at a temperature above the melting point of the fatty acid salts used in step c), to obtain the pigment of the invention.

The preferred process for producing pigment of the invention optionally additionally comprises one, two, three or four of the steps of i) isolating the pigment, ii) washing the pigment, iii) drying the pigment, and iv) comminuting the pigment.

The pigments used in step a) of the preferred process are pulverulent pigments or pastes made from pigments which originate directly from the pigment production operation. Pastes are pigment-containing aqueous suspensions.

In a further embodiment (step b"), the addition of the precipitant from the group of alkali metal hydroxides, alkaline earth metal hydroxides and ammonia, preferably in dissolved form, and of the magnesium and/or calcium salts, preferably in dissolved form, to an initial charge of pigment suspension can also be effected simultaneously. The alternative steps b), b') or b") result in coating of the inorganic compound with at least one hydroxide or oxide of magnesium or calcium. In this embodiment, step b") is followed in accordance with the invention, in step c), by the application of the second coating comprising at least one calcium salt or magnesium salt of a fatty acid of the general formulae (I), (II), (III) and/or (IV), preferably comprising calcium stearate and/or magnesium stearate, to the pigment from step b").

The precipitants particularly preferred in the process of the invention are sodium hydroxide and/or potassium hydroxide.

In the embodiments according to steps b), b') or b"), preference is given to using magnesium and/or calcium salts, more preferably aqueous solutions thereof, most preferably magnesium sulfate, magnesium chloride, magnesium nitrate, calcium chloride and/or calcium nitrate.

During the precipitative application of the coating composed of at least one hydroxide or oxide of magnesium or calcium to the inorganic compound and optionally during the further reaction, preferably a temperature of 10 to 99° C., more preferably of 20 to 85"·C and most preferably of 20 to 70° C. is chosen.

The time during which either the precipitant or the magnesium and/or calcium salts are added to the reaction mixture may vary within wide ranges.

Preference is given to mixing the reaction components in steps b), b') or b"), more preferably by means of static or dynamic mixers. For this purpose, for example, stirrers, propellers, paddles and/or pumps are used.

The reaction mixture from steps b), b') or b"), after the components have been added, is optionally mixed further, in order to allow the precipitative application of the hydroxides and/or oxides of magnesium and/or calcium to the inorganic compound to proceed to a maximum degree. The time for the further reaction depends on the size of the reaction mixture. To check the completeness of the reaction, samples can be taken at time intervals, which are analysed for the magnesium and/or calcium content. If the expected magnesium and/or calcium content is attained, the reaction is ended.

In step c) of the preferred process of the invention, during the coating with calcium salts and/or magnesium salts of fatty acids of the general formulae (I), (II), (III) and/or (IV), preferably with calcium stearate and/or magnesium stearate, onto the pigment and, if appropriate, during the further reaction, preferably a temperature above 80° C., preferably of 90° C. to 200° C., is chosen. In a preferred embodiment, steps i), ii), iii) and iv) are conducted after step b), b') or b"), such that a dried and comminuted pigment is obtained, which is subsequently used in step c) of the preferred process of the invention.

Preferably, the reaction components are mixed in step c) by means of heatable mixers, more preferably by means of Henschel mixers, Step c) is effected typically at speeds of 300 to 2500 revolutions per minute, preferably of 500 to 1500 revolutions per minute (rpm).

The reaction mixture from step c), after the addition of the components, is optionally subjected to further mixing, in order to allow the coating comprising at least one fatty acid salt, preferably comprising magnesium stearate and/or calcium stearate, to run to completion. The time for the further reaction depends on the size of the reaction mixture. To check the completeness of the reaction, samples can be taken at time intervals, which are analyzed for the content of fatty acid salt, preferably comprising magnesium stearate and/or calcium stearate. If the expected content of magnesium stearate and/or calcium stearate is attained, the reaction is ended, The product of the invention obtained after step c), like the pigment used in step a), is typically in pulverulent form and therefore does not require any further workup steps.

The additional coating comprising at least one fatty acid salt can also be implemented via wet methods. For example, it is possible to add sodium stearate solution to an aqueous suspension of pigment already coated with magnesium hydroxide while stirring. Subsequently, by addition of calcium salt or magnesium salt solution (e.g. calcium nitrate or magnesium sulfate) while stirring, a precipitation reaction is conducted, in which the second coating of the magnesium hydroxide-coated pigment with calcium stearate is effected. After the reaction has ended, the inorganic pigment of the invention is optionally separated from the reaction mixture by customary methods, for example filtering or centrifuging. The solids removed are then optionally washed with water, preferably with demineralized water, preferably until the filtrate only has a conductivity of less than or equal to 2000 µS/m, more preferably of less than or equal to 1500 µS/m. The washing is typically followed by standard drying and grinding steps.

In a further preferred embodiment for production of the pigment of the invention, in which the coating of at least one hydroxide or oxide of magnesium or calcium is the outer layer, the process of the invention comprises at least the steps of x) applying a coating comprising at least one calcium salt or magnesium salt of a fatty acid of the general formulae (I), (II), (III) and/or (IV), where n is from 10 to 20, preferably from 15 to 19, preferably comprising calcium stearate and/or magnesium stearate, by mixing the at least one inorganic compound selected from the group of the iron oxides, iron oxide hydroxides, zinc ferrites, zinc oxides, magnesium ferrites and manganese ferrites with at least one calcium salt and/or magnesium salt of at least one fatty acid of the general formulae (I), (II), (III) and/or (IV), where n is from 10 to 20, preferably from 15 to 19, preferably comprising calcium stearate and/or magnesium stearate, at a temperature above the melting point of the fatty acid salts used in step c), and y) producing an aqueous suspension of the product from step x), and z') precipitating the coating of at least one hydroxide or oxide of magnesium or calcium onto the product from step x) present in the aqueous suspension by adding magnesium salts and/or calcium salts, preferably in dissolved form, to the suspension from step y) and then adding a precipitant selected from the group of alkali metal hydroxides, alkaline earth metal hydroxides and ammonia, preferably in dissolved form, to the suspension or z") precipitating the coating of at least one hydroxide or oxide of magnesium or calcium onto the product from step x) present in the aqueous suspension by adding a precipitant selected from the group of alkali metal hydroxides, alkaline earth metal hydroxides and ammonia, preferably in dissolved form, to the suspension from step y) and then adding magnesium salts and/or calcium salts, preferably in dissolved form, to the suspension, to obtain the pigment of the invention.

Alternatively, the organic coating can also be implemented in the manner which follows. Magnesium sulfate is added to an aqueous pigment suspension in such an amount that the amount is sufficient for the first magnesium hydroxide layer and the second magnesium stearate layer. Thereafter, an appropriate amount of sodium hydroxide solution which leads to the formation of a magnesium hydroxide layer on the pigment surface is added dropwise while stirring. Subsequently, while stirring, a defined amount of sodium stearate solution which leads to the precipitation reaction of magnesium stearate from the magnesium sulfate present in the solution is added. After the reaction has ended, the inorganic pigment of the invention is optionally separated from the reaction mixture by customary methods, for example filtering or centrifuging. The solids removed are then optionally washed with water, preferably with demineralized water, preferably until the filtrate only has a conductivity of less than or equal to 2000 µS/m, more preferably of less than or equal to 1500 µS/m. The washing is typically followed by standard drying and grinding steps.

The drying of the pigment of the invention by the processes of the invention typically takes place at temperatures of 80 to 200° C., optionally under lower pressure than ambient pressure.

In processes for producing pigments, calcination steps are used in some cases. Calcination is understood to mean a thermal treatment of a solid or semi-moist pigment at temperatures of greater than 600° C. This may be necessary when pigments are to be dewatered or converted to other polymorphs. In the process of the invention, no calcination step is required. In a preferred embodiment of the process of the invention, therefore, a calcination step is ruled out, in a particularly preferred embodiment of the process of the invention, therefore, a calcination step at temperatures of greater than 600° C. is ruled out.

The pigments of the invention are an improvement over the prior art, since plastics products and products made from PVC which have been colored with the coated pigments of the invention have a high thermal stability and/or UV stability.

EXAMPLES AND METHODS

I. Description of the Measurement and Test Methods Used

The results of the measurements for the examples are summarized in table 1.

I.1 Mg and Ca Determination

The magnesium and calcium content of the pigments was measured via optical emission spectrometry after excitation in an inductively coupled plasma (ICP-OES: inductively coupled plasma-optical emission spectrometry) as the content of the elements.

I.2 Oil Value

The oil value was determined according to standard DIN ISO 787/5 in g of oil/100 g of sample. "Sample" means either the uncoated pigment or the pigment of the invention.

I.3 Testing of PVC Stability by Means of Thermo Haake Rheomix 600p Kneader (Kneader Stability)

A pulverulent PVC mixture consisting of 50% by weight of Vestolit B 7021 Ultra+50% by weight of SorVyl DB 6668 Natur 3/03 is mixed homogeneously with the pulverulent pigment sample to be tested (4% by weight based on 100% PVC composition).

A pulverulent PVC mixture consisting of 50% by weight of Vestolit B 7021 Ultra+50% by weight of SorVyl DB 6668 Natur 3/03 is mixed homogeneously with the pulverulent pigment sample to be tested (4% by weight based on 100% PVC composition) or the mixture to be tested.

The pigmented PVC mixture is introduced manually into the recording kneader (Thermo Haake Rheomix 600p with R6 roll rotors) which has been preheated to 190° C. and is equipped with a rotary rheometer. The recording program (PolyLab Monitor) is started and records the torque on the roll rotors and the temperature of the sample against time. The pigmented PVC mixture is kneaded at 190° C. and 50 rpm. In order to determine the suitability of the coated pigment with regard to the stabilization of PVC, the maximum torque on the time axis in minutes at which the highest product temperature was measured is reported. After this maximum torque, the torque declines significantly, since the PVC breaks down to an increasing degree after this time and the viscosity of the kneaded product decreases as a result. These values are compared with the corresponding value for the same, albeit uncoated, pigment powder. The longer the period of time until said maximum, the higher the stability of the PVC colored with the coated pigment.

II: Examples

II.1 Properties of the Inorganic Pigments and Plastics Used

Bayferrox® 110 pigment powder from LANXESS Deutschland GmbH: hematite (red iron oxide, α-Fe2O3) having a BET surface area to DIN ISO 9277 of 13-16 m$^2$/g.

Bayferrox® 920: goethite, α-FeOOH paste from LANXESS Deutschland GmbH, from which Bayferroxe® 920 powder is produced by drying and grinding. The pulverulent pigment has a BET surface area to DIN ISO 9277 of 11-15 m$^2$/g. Alternatively, it is also possible to mix the pulverulent Bayferrox® 920 pigment with water to give a slurry having the appropriate pigment concentration (see examples).

Calcium stearate: Powder from VWR BCH PROLABOV with Ca content between 9% and 11% by weight (calculated as CaO), SorVyl DB 6668 Natur 3/03: Rigid PVC compound from Polymerchemie (powder form, stabilized with Ca/Zn, where the content of bis(pentane-2,4-dionato)calcium is less than 1% by weight, with softening point>120° C., flashpoint>190° C., ignition temperature>303° C., density to DIN EN ISO 1183-1, method A of 1.39 g/cm$^3$, bulk density to DIN EN ISO 60 of 0.54 g/ml, thermal stability to DIN EN 60811-3-2 of greater than/equal to 25 min.).

VESTOLIT® B 7021 Ultra: Mikro-S-PVC homopolymer from Vestolit (powder form, K value to DIN EN ISO 1628-2 of 70, viscosity number to DIN EN ISO 1628-2 of 125 cm$^3$/g, bulk density to DIN EN ISO 60 of 0.3 of g/cm$^3$, sieve analysis—residue on 0.063 mm sieve to DIN EN ISO 1624 of <1%, water content according to K. Fischer DIN 53 715 of ≤0.3%, pH of the aqueous extract to DIN EN ISO 1264 of 8, 1.5/s paste viscosity of 1.8 Pa s, 45/s paste viscosity of 2.2 Pa s).

II.2 Inventive Examples and Comparative Examples

Example 1 (Comparative Example)

145.5 g of Bayferrox® 110 pigment and 4.5 g of calcium stearate were added to the Henschel FM4 mixer. The two substances were mixed together at 161° C. and 1000 rpm for 20 min. The pulverulent product is used for the testing without further treatment.

Example 2 (Comparative Example)

141 g of Bayferrox® 110 pigment and 9 g of calcium stearate were added to the Henschel FM4 mixer. The two substances were mixed together at 164° C. and 1000 rpm for 20 min. The pulverulent product is used for the testing without further treatment.

Starting Material 1 for Examples 3 and 4

To 3.3 dm$^3$ of aqueous suspension of Bayferrox® 110 (6.26 mol of Fe$_2$O$_3$) having a pH of 4.9 were added, at 60° C. while stirring, 1923 mL of an MgSO$_4$ solution (2.58 mol/dm$^3$ as MgO). Subsequently, 5.12 mol of NaOH per mole of Fe$_2$O$_3$ were added dropwise as a solution while stirring within 30 min. (2850 g with concentration 16.6 mol/dm$^3$). The suspension was stirred for a further 60 min. The pH of the suspension was >11. After the reaction had ended, the pigment was filtered through a suction filter, washed until the conductivity of the filtrate was below 300 μS/cm, dried to constant weight in a drying cabinet at 120° C. and ground in a Bauemieister mill (cross-beater mill with a sieve insert, mesh size 1 mm).

Example 3 (Inventive)

145.5 g of pigment (starting material 1) and 4.5 g of calcium stearate were added to the Henschel FM4 mixer. The two substances were mixed together at 162° C. and 1000 rpm for 20 min. The pulverulent product is used for the testing without further treatment.

Example 4 (Inventive)

141 g of pigment (starting material 2) and 9 g of calcium stearate were added to the Henschel FM4 mixer. The two substances were mixed together at 165° C. and 1000 rpm for 20 min. The pulverulent product is used for the testing without further treatment.

The properties of the products are summarized in Table 1.

TABLE 1

| Example | Mg content (% by wt.) | Calcium stearate content (% by wt.) | Oil value (g of oil/ 100 g of sample) | Kneader stability (min.) |
|---|---|---|---|---|
| Bayferrox ® 110 [a] | 0.01 | 0 | 24.8 | 14 |
| 1 | 0.01 | 3 | 24.8 | 14 |
| 2 | 0.01 | 6 | 23.6 | 14 |
| 3 | 10.5 | 3 | 33.1 | 19 |
| 4 | 10.2 | 6 | 29.4 | 20 |

[a] uncoated pigment as direct comparison with examples 1 to 4

What is claimed is:

1. A pigment comprising at least one inorganic compound selected from the group consisting of iron oxides, iron oxide hydroxides, zinc ferrites, zinc oxides, magnesium ferrites, and manganese ferrites, wherein the at least one inorganic compound comprises a coating, and the coating consists of:
    at least one hydroxide and/or oxide of magnesium and/or calcium; and
    at least one calcium salt and/or magnesium salt of a fatty acid of the general formulae $C_nH_{2n+1}$COOH(I), $C_nH_{2n-1}$COOH(II), $C_nH_{2n-3}$COOH(III) and/or $C_nH_{2n-5}$COOH(IV), where n is from 10 to 20,
    wherein the coating of the at least one inorganic compound consists of an outer layer and an inner layer, wherein
    A) one of the two layers is said at least one hydroxide or oxide of magnesium or calcium and
    B) the other of the two layers is said at least one calcium salt or magnesium salt of a fatty acid of the general formulae $C_nH_{2n-1}$COOH (I), $C_nH_{2n-1}$COOH (II), $C_nH_{2n-3}$COOH (III) and/or $C_nH_{2-5}$COOH (IV), where n is from 10 to 20, wherein the layer according to A) is the inner layer.

2. The pigment as claimed in claim 1, wherein the coating is bonded directly to the at least one inorganic compound.

3. The pigment as claimed in claim 1, wherein the pigment comprises 0.3% to 30% by weight of magnesium and/or calcium, calculated as the sum total of the contents of the elements magnesium and calcium, where the sum total of the contents of the elements magnesium and calcium is based on the total weight of the pigment.

4. A method of coloring polyvinyl chloride, the method comprising mixing the pigment as claimed in claim 1 with polyvinyl chloride.

5. The pigment as claimed in claim 1, wherein:
   the coating is bonded directly to the at least one inorganic compound;
   the coating of the at least one inorganic compound consists of an outer layer and an inner layer, wherein
   A) one of the two layers is said at least one hydroxide or oxide of magnesium or calcium and
   B) the other of the two layers is said at least one calcium salt or magnesium salt of a fatty acid of the general formulae $C_nH_{2n+1}COOH$ (I), $C_{2n-1}COOH$ (II), $C_nH_{2n-3}COOH$ (III) and/or $C_nH_{2n-5}COOH$ (IV), where n is from 15 to 19,
   the pigment comprises 0.5 to 25% by weight of magnesium and calcium, calculated as the sum total of the contents of the elements magnesium and calcium, where the sum total of the contents of the elements magnesium and calcium is based on the total weight of the pigment; and
   the pigment comprises 0.2% to 15% by weight of the at least one calcium salt and/or magnesium salt of a fatty acid.

* * * * *